(12) United States Patent
Hong et al.

(10) Patent No.: US 9,203,905 B1
(45) Date of Patent: Dec. 1, 2015

(54) SESSIONIZATION OF VISITOR ACTIVITY

(75) Inventors: Jerry Hong, Sunnyvale, CA (US);
Sagnik Nandy, Los Gatos, CA (US); Avi Mehta, Irvine, CA (US); Naomi Ben-Ayoun, Santa Clara, CA (US);
Bradley David Townsend, Santa Ana, CA (US); Paul Nicolas Muret, Los Altos, CA (US); James Lee Wogulis, Laguna Beach, CA (US); Madhu Kallazhi Vasu, Sunnyvale, CA (US);
Evan S. Huang, Cupertino, CA (US);
Neil Campbell Rhodes, Redlands, CA (US)

(73) Assignee: Google Inc., Mountain View, CA (US)

( * ) Notice: Subject to any disclaimer, the term of this patent is extended or adjusted under 35 U.S.C. 154(b) by 527 days.

(21) Appl. No.: 13/595,714

(22) Filed: Aug. 27, 2012

(51) Int. Cl.
*H04L 29/08* (2006.01)
*H04L 9/32* (2006.01)

(52) U.S. Cl.
CPC .............. *H04L 67/14* (2013.01); *H04L 9/3268* (2013.01)

(58) Field of Classification Search
CPC ... H04L 65/1086; H04L 67/14; H04L 67/148; H04L 9/3268; H04L 65/1083
USPC ................................................ 709/227, 228
See application file for complete search history.

(56) References Cited

U.S. PATENT DOCUMENTS

| | | | |
|---|---|---|---|
| 5,999,525 A * | 12/1999 | Krishnaswamy et al. | 370/352 |
| 6,909,708 B1 * | 6/2005 | Krishnaswamy et al. | 370/352 |
| 7,171,478 B2 | 1/2007 | Lueckhoff et al. | |
| 7,792,954 B2 | 9/2010 | Hanson et al. | |
| 8,010,679 B2 * | 8/2011 | Low et al. | 709/227 |
| 8,051,180 B2 * | 11/2011 | Mazzaferri et al. | 709/227 |
| 8,145,768 B1 * | 3/2012 | Hawthorne | 709/228 |
| 8,601,556 B2 * | 12/2013 | Kanekar | 726/6 |
| 8,843,997 B1 * | 9/2014 | Hare | 726/3 |
| 2006/0248283 A1 * | 11/2006 | Galchev et al. | 711/141 |
| 2007/0180448 A1 * | 8/2007 | Low et al. | 718/1 |
| 2012/0030027 A1 | 2/2012 | Nomula | |

OTHER PUBLICATIONS

Ivancsy, et al., "Analysis of Web User Identification Methods," World Academy of Science, Engineering and Technology, Aug. 28, 2007, pp. 338-345, vol. 34, Department of Automation and Applied Informatics at Budapest University of Technology and Economics.

* cited by examiner

*Primary Examiner* — Kristie Shingles
(74) *Attorney, Agent, or Firm* — Foley & Lardner LLP; John D. Lanza

(57) ABSTRACT

A method for sessionization of visitor activity includes receiving a first activity of a first client and a first client identifier from the first activity of the first client; the first client identifier stored at the first client; creating a first session from the first activity and the first client identifier; receiving a session link associated with the first activity; and creating a visitor-identified session based on the first client identifier, the first activity, and the session link.

30 Claims, 6 Drawing Sheets

SESSIONIZATION OF VISITOR ACTIVITY

BACKGROUND

Entities that provide resources have an interest in knowing how those resources are being used, who is using the resources, and if the systems and methods employed in making the resources available are optimum. To addresses these concerns, entitles may employ some type of tracking system that monitors resource usage and reports the results to the entitles.

One example of a resource is an Internet Web site, the site's Web pages, and the content the Web pages contain. To monitor resource usage in the context of an Internet Web site, a Web site owner may employ software systems that track Web site visitors. Such systems may identify each visitor, record each visitor's activity during a Web site visit, and report the identity and activity to an analytics program that analyzes and stores the data and makes the data available to the Web site owner for use in improving the Web site, the Web site content, and the manner in which the Web site content is made known and available to the visitor.

DESCRIPTION OF THE DRAWINGS

The detailed description refers to the following figures in which like numerals refer to like items, and in which.

DETAILED DESCRIPTION

Figure 1A:
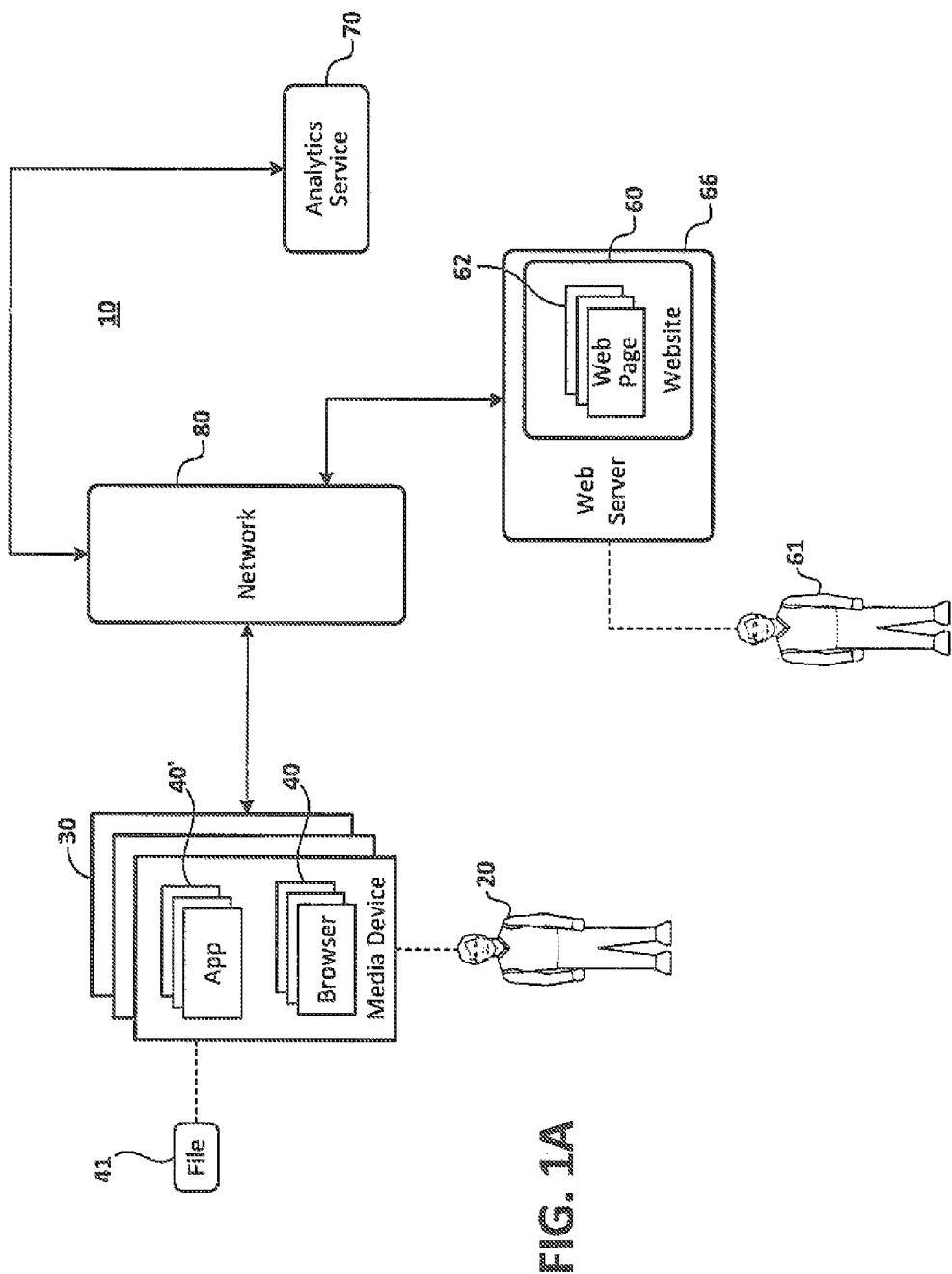
FIG. 1A illustrates an example environment in which visits and visitor activity may be monitored, analyzed, and reported.

Resource providers may have an interest in knowing how and when their resources are used, who uses the resources, and if the systems and methods employed in making the resources available are optimum. To addresses these concerns, resource providers may employ or rely on some type of tracking system that monitors, analyzes, and reports resource usage. Such monitoring may be done in a way that does not use of any personally-identifiable information of an individual.

An example of a resource is an Internet Web site, the site's Web pages, and the content the Web pages contain. To monitor resource usage in the context of an Internet Web site, a Web site owner may employ software systems that track Web site visitors. Such systems may identify each visitor, record each visitor's activity during a Web site visit, and report the identity and activity to an analytics service. In a process that may be referred to as sessionization, the analytics service may compile, analyze and store the data; the analytics service then may make the analysis available to the Web site owner for use in improving the Web site, the Web site content, and the manner in which the Web site content is made known and available to Web site visitors. As noted above, this process may be completed in a way that ensures the visitor's personally identifiable information is not given to the Web site owner.

Another resource is an application that executes on a media device such as a smartphone or tablet, or on a laptop computer. An example of an application is an online banking application. Applications may include mobile applications (i.e., executing on mobile media devices). Activity that occurs during operation of an application also may be sessionized.

Sessionization processes also may be applied to activity that does not involve access to or use of a "traditional" resource, as defined by example, above. Any activity that may be monitored may be sessionized. For example, in a virtual conference room or conference call scenario, every time a visitor enters the virtual conference room or joins the conference call, a computing device may report to the analytics service. The activity during the virtual conference or the conference call may be compiled and a session may be created.

Returning to the Internet as an example, a way to monitor Web site visits and activity is to use software programs and data storage in devices that a visitor uses when visiting a Web site. A technique employs small programs that reside on a visitor's media device and that record information from the visited Web sites. The recorded information may identify the visitor's media device using an anonymized identification (a random ID) and activity of the visitor during the Web site visit. The random ID then may be used to identify the visitor's media device during subsequent visits of the media device to the same Web site. Finally, the random ID, activity, and other information may be reported to an analytics program for analysis, storage, and reporting, and the Web site owner may access the analytics program to receive Web site visit reports.

One feature or operation of the analytics program involves creating sessions based on observed visitor activity during a Web site visit. The activity may be "clicks," where a visitor selects an actionable item, such as a link, on a Web page. The process of creating sessions may be termed "sessionization." An example sessionization operation may define a visitor's Web site browsing sessions from the recorded clicks, by grouping the clicks from the visitor based, for example, on a time-intervals between the clicks. For example, if two clicks from the same visitor are made too far apart in time (as defined, for example, by a time-out threshold), the clicks may be treated as coming from two browsing sessions.

However, current analytics systems and methods are hampered and thus limited by the fact that data monitoring is performed at the visitor's device, typically through use of Java script. This requires the programming used to monitor and collect the information be replicated at each visitor's media device, whether for monitoring Web site visits or application usage. Current analytics systems and methods also are not able to correlate visits by the same visitor to the same resource using multiple devices (i.e., current systems and methods cannot correlate visits from two different browsers operated by the same visitor as coming from that same visitor).

To overcome these and other limitations with current analytics systems and methods, disclosed herein are sessionization and session stitching systems, and corresponding methods. The sessionization and session stitching systems move much of the monitoring functions from a client side to a back-end server side, and the systems and methods may a use mechanism to create sessions based on visitor activity. In an example, the mechanism is a unique visitor identification, and the systems and methods use the visitor identification as a trigger for stitching together of sessions generated based on one or both of the random ID and the unique visitor identification.

As stated above, the process of creating sessions, or "sessionization," involves gathering together visitor actions, such as clicks at a Web site or selections on an application, which occur within a specified time. Thus, in the example of a Web access, a session might include all of the visitor's Web site clicks that are, for example, within 30 minutes of each other. The click data may be gathered and a session defined by a Web server. An analytics service then may detect click patterns from the session, and the click patterns may be used, for example, for fraud detection, ads promotion, revenue prediction, and other purposes. For example, the Web server may sessionize two Web site clicks by a visitor that are within 30 minutes of each other as the same session, either because the second click can be reasonably treated as a click through from the first click, or because the second click does not involve the visitor leaving the Web site. However, if the second click is more than 30 minutes after the first click, the Web server may regard the two clicks as not related and may treat the second click as part of a new session. Thus, general timing rules may result in two sessions when in fact, the visitor never left the Web site.

Note that the 30-minute threshold disclosed above is for example only, and longer or shorter threshold periods may be invoked.

The sessionization process becomes more complicated when a visitor logs on to a Web site partway into a Web site visit because a Web site owner might want the pre- and post-log on activity (clicks) treated as part of a single session. Even more complications may arise when the visitor uses different devices to access the same Web site. Again, the Web site owner may want the separate accesses using the different devices treated as a single session, or somehow related. As described below, the herein disclosed systems and methods address these Web site owner concerns.

For ease of description, but without any limitation, the systems and methods refer to the following:

A resource is any information, data, content, product or service that may be accessed and used by an individual. Resources include Web sites and Web pages, and the information, data, and content provided thereon, as well as any other online content. Resources also include applications and content that may not be accessed online, such as, for example, a game; in this example, the game may send visitor/user behavior or activity during the game to the analytics service. Resources may also include a sales lead; in this example, a sales person may send results of an interview to the analytics service.

A visitor is a human or machine user who or that visits a Web site, uses an application, or otherwise engages in activity that may be monitored, recorded, and reported to an analytics service.

A client is a software routine or a media device that includes features that allow visits to Web sites and use of applications to be monitored. A software example of a client is an Internet browser. Clients also include applications that execute on media devices. Such applications include, for example, mobile banking applications that execute on a smart phone.

A media device may be a smart phone, a tablet, a lap top computer, and an internet-enabled television, for example. An Internet enabled television may have required processing capabilities included as internal components of the television, or included in a set top box, Blu-ray™ player, game box, or other box that connects to the television. A media device also may be any other computing device, including a command line tool, that is capable of recording and reporting behavioral activity to an analytics service.

A Web site owner owns and operates a Web site, which may include multiple Web pages.

An analytics service may operate in conjunction with Web site owners to collect, analyze, and report information and data related to visits to Web sites by visitors. The analytics service may be part of the Web site, or may be a separate entity.

An example sessionization system, and corresponding process, creates a session from a visit based on a random ID assigned to a visitor's client. However, such a session may not be tied to a specific visitor.

Another example session may be created from a visit based on the random ID and in addition a visitor identification (visitor ID). This other example session may be referred visitor-identified session. In this example, sessionization of visitor activity may include receiving a first activity and a first client identifier from the first activity of a first client, receiving a session link associated with the first activity; and creating a first session based on the first client identifier, the first activity, and the session link. In this example, the session link may be a visitor ID created, for example, from a visitor log on at a resource. Thus, the session in this example may be tied to a specific visitor.

Still another example session may be created based on the random ID, the visitor ID, and visit data. Yet another example session may be created based on the random ID and the visitor ID.

In a further embodiment, a session may be created based on activity information sent from a client or visitor directly to the analytics service and without accessing a resource.

In an embodiment, the random ID identifies a specific client. For example, each browser on a lap top computer may have its own random ID. The random ID is created by a Web site's Web server. The random ID is stored in a temporary file with the lap top computer, and continues to be stored in the file after a resource visit (e.g., Web site browsing session) is concluded. A Web server may use the random ID to identify the client (the browser) during subsequent visits to the same Web site. The random ID does not personally identify a human user of the lap top computer.

The visitor identification (visitor ID) is unique to the human user. The Web server may generate the visitor ID. The Web server may generate the visitor ID when the human user (visitor) logs on to the Web site. Note that such a log on need not result in the Web server receiving any personally-identifiable information of the visitor. The visitor ID is not saved in a file on the lap top computer.

An example session stitching system, and corresponding process, stitches two or more sessions together when the sessions are created based on: (1) activity, such as resource visits, by a common client (i.e., a same random ID); and (2) a linking mechanism that identifies the sessions to a common visitor. In an example, the linking mechanism is the visitor ID. The session stitching may apply to sessions that are separated in time by less than a threshold value, such as, for example, 30 minutes. Thus, when a visitor visits a resource such as a Web site, a random ID is created (or retrieved), and a first session is created. If the same visitor subsequently logs in to the Web site, a second session (which may be referred to herein as a visitor-identified session) based on the same random ID and now a visitor ID, may be created. The sessionization and session stitching system then may stitch the first session and the second (visitor-identified) session together. In this example, the sessionization and session stitching system links the visitor ID with the random ID when creating the visitor-identified session. A subsequent or prior visit by the same client (which retrieves the same random ID as the visitor-identified session) to the same resource (Web site) occurring within a specified time out (e.g., within 30 minutes) creates a session that may be stitched to the visitor-identified session. This prior-in-time or subsequent session may be generated using only the random ID or may be generated using both the random ID and the visitor ID. Because the two sessions have the same random ID, and at least one session has a unique visitor ID, the system may stitch the two sessions together to form a single session.

The sessionization and session stitching system also may propagate attributable events among sessions having the common visitor (i.e., the same visitor ID), even if the sessions were created based on visits from different clients. One example of an attributable event is a promotional campaign.

In operation, the example session stitching system stitches together two or more sessions after first receiving visit data and a first client identifier from a first client visit by a first client to a resource. The first client identifier is a random identification created by the resource, sent by the resource to the first client, and stored at the first client. In an embodiment, the resource is an Internet Web site and the first client is an Internet browser. The system then creates, if not already done so by the resource, a first session based on the visit data and the first client identifier of the first client visit. Next, the system receives a session link associated with the first client visit. The session link, in an embodiment, is a visitor identification. The visitor identification may be created by the resource when the visitor enters a user name and password, for example, at the resource. Logging on, which generates the visitor identification, leads to the system creating a second session (a visitor-identified session) based on the same random identification as the first client visit. The system may stitch together the first session and the second (visitor-identified) session. The system then looks for existing, stored sessions, or subsequently creates another session from a second client visit to the resource. The second client visit has associated the same first client identifier as in the first client visit. Based on a common client identifier (i.e., the first and second client visits involve the same random identification) and the session link, the system stitches together the already stitched-together first and second sessions and the other session.

The processes executed by the sessionization and session stitching systems disclosed herein may, as noted above, involve use of information that in some respect identifies a client or a visitor, including a human visitor. However, any information obtained by and used by the system, and/or the resources is made anonymous such that a human visitor cannot be identified. For example, a human visitor may sign up with an internet service provider, on-line banking system, or other resource or resource provider and establish a user identification (ID) and set a password. The user ID is an anonymous abstraction of the human visitor and does not identify the human visitor in a way that could compromise the human visitor's privacy. A resource may use a log on by the human visitor to generate a visitor ID, and the sessionization and session stitching system may use the visitor ID in the session stitching processes. As part of the initial sign up process, the human visitor also may provide personally-identifiable information such as name and address. However, to protect the visitor's privacy, the information may be "anonymized" or "partially anonymized". Examples of partially anonymized information may include the IP address of a media device or the user ID. Thus, anonymized information may be any information that sufficiently identifies the human visitor or client without compromising the visitor's privacy, such as a user pseudonym or other abstraction of the visitor's actual identity. The anonymized information may include cookies, individual/device identifiers, or other information about the visitor's identity. The resource provider then, with the consent of the visitor, and perhaps for a reduced subscription fee, may make some of this information available for the purposes of sessionization and session stitching. The registration may be a one-time registration or a recurring process.

Furthermore, the systems and methods disclosed herein may provide for the human visitor to opt in or opt out of all aspects or a specific aspect of the sessionization and session stitching processes at any time. The human visitor could calibrate the degree of opt in/opt out by specifying the specific pieces of information that may be used in the processes and specific pieces of information that may not be used in the processes.

FIG. 1A illustrates an example environment in which resource visits and activity may be monitored and reported. In FIG. 1A, environment 10 includes media device 30 operated by visitor 20, Web server 66, which hosts Web site 60 operated by Web site owner 61, and analytics service 70. The media device 30, Web server 66, and analytics service 70 connect to and communicate through communications network 80.

The visitor 20 operates the media device 30 to access and use resources such as those provided at the Web site 60. For example, the visitor 20 may operate browser 40 to search for Web sites related to specific topics or to search for a specific Web site by url. The visitor 20 may cause the media device 30 to execute an application 40', such as a mobile banking application, to access online banking services. The application 40' may involve use of a browser or other means, including cellular means, to connect to the online banking services.

When visiting the Web site 60, the visitor 20 may register with and log on to the Web site 60 by providing a visitor-created identification (hereafter, a user ID) and a password and/or pass code, for example. Alternately, the visitor 20 may access the Web site 60 without registering and without logging on. Whether or not logged on, the visitor 20 may take actions that may be recorded as visitor actions at the Web site 60 such as clicking on a link, filling a shopping cart, down loading content, uploading content, purchasing a product or service, or filling out a form, for example.

When using the application 40', the visitor 20 may make various selections that also may be recorded and analyzed. For example, the visitor may select a pop-up or overlay advertisement presented during execution of the application 40'.

The media device 30 includes browsers 40 and applications 40' (i.e., clients). In an example, a browser 40 may include computer code to store file 41 and record visitor actions. The browser 40 may store information related to Web site visits, including a url of the Web site, date and time of visit, length of visit (or start and stop time of visit), and actions taken by the visitor 20 during the visit. The browser 40 may store information that unambiguously identifies the visitor 20. However, the browser 40 may do so without storing any personally-identifiable information regarding the visitor 20. Similarly, the application 40' may store visitor identification information, Internet address information, and other data and information related to use of the application 40'.

In another example, when a visitor 20 visits the Web site 60 (or uses an application 40') the file 41 stores the random ID 42 and no other Web site data. In this example, the file 41 is provided to the analytics service 70 either directly from the client (browser) 40 or by way of the Web server 66. The analytics service 70 then creates a session based on the random ID. If the visitor 20 logs on to the Web site 60, whereby the Web server 66 generates a visitor ID, the Web server 66 may send the visitor ID to the analytics service 70. The Web server 66 also may send any "hits" that occur at the Web site 60 during the visit. The analytics service 70 then may create a session using the random ID, the visitor ID (if available) and the "hits" information.

The media device 30 may communicate through the network 80 directly to the analytics service 70. For example, an application 40' on the media device 30 may be a game. The individual game moves (clicks) made by the visitor 20 in playing the game may be sent directly to the analytics server 70 by the media device 30.

The network 80 may be any communications network that allows the transmission of signals, media, messages, voice, and data to the media device 30 from another media device, computer, or server, including radio, linear broadcast (over-the-air, cable, and satellite) television, on-demand channels, over-the-top media, including streaming video, movies, video clips, and games, and text, email, and still images, and transmission of signals, media, messages, voice, and data from the media device 30 to another media device, computer, or server. The network 80 includes the Internet, cellular systems, and other current and future mechanisms for transmission of these and other media. The network 80 may be both wired and wireless.

The Web site 60 includes one or more Web pages 62. The Web site 60 may be any Internet-based resource. The Web site 60 may be an Internet search Web site; a social network Web site; a commercial Web site selling products and services, and providing information about the products and services; and an online service such as an online banking service or an online dating service.

The Web site owner 61 operates the Web site 60 using Web server 66. The Web site owner 61 may provide data, information, online applications, and content for access, display, and use through the Web pages 62. The Web site owner 61 may operate the Web server 66 to report visit data, random IDs, and visitor IDs, and other information, to the analytics service 70.

The Web site owner 61 may operate other servers (not shown) that monitor and record information related to the access and use of the data, online applications, and content on the Web pages 62.

The analytics service 70 collects, analyzes and reports on data and information related to visits to the Web site 60, operation of the applications 40', and other reported activity. The analytics service 70 is described in more detail below.

Figure 1B:
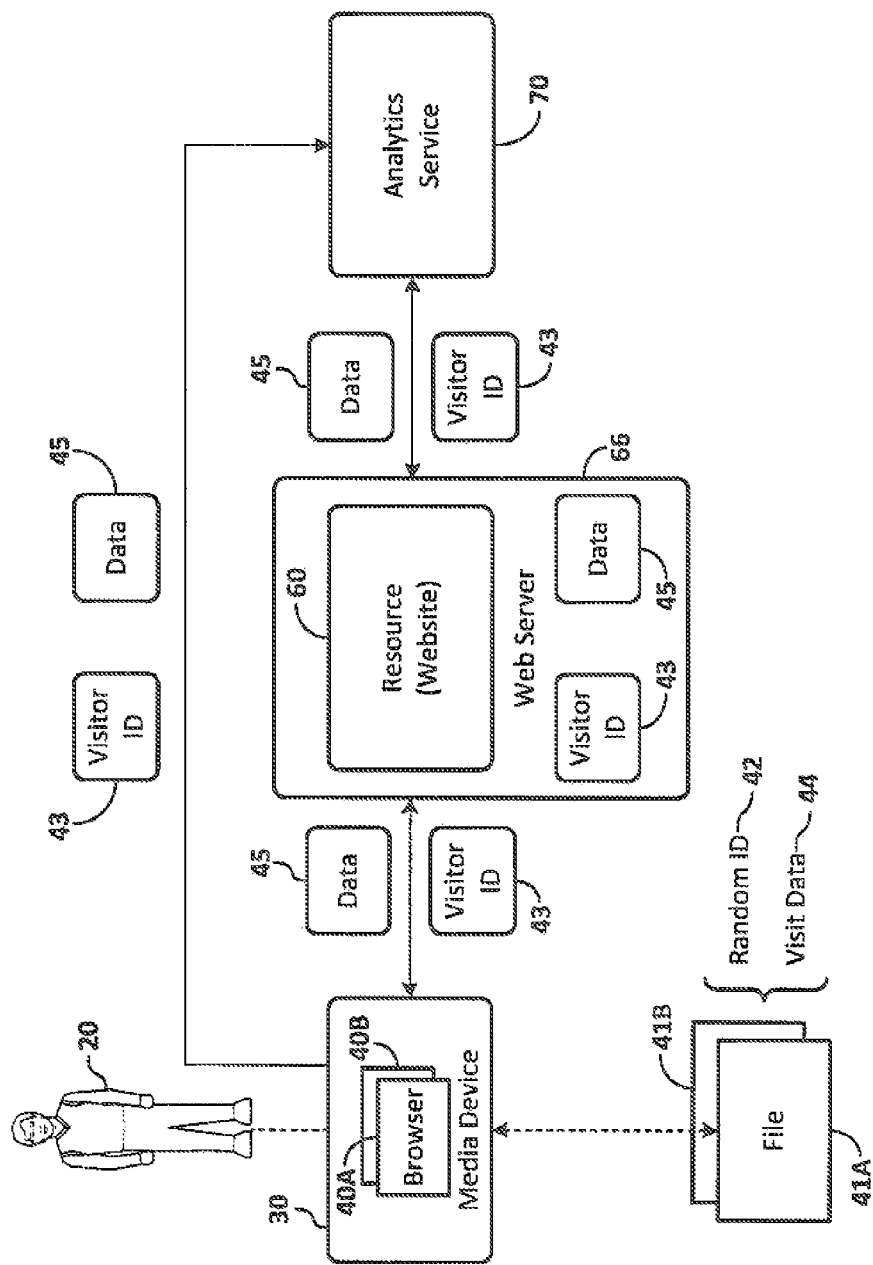
FIG. 1B illustrates an example of visit monitoring interactions among entities in the FIG. 1A environment.

FIG. 1B illustrates an example interaction among the media device 30, the Web site 60, and the analytics service 70. In FIG. 1B, visitor 20 operates media device 30 to access Web site 60. In this example, the media device 30, using browser 40, accesses the Web site 60. Web server 66 at the Web site 60 is programmed to read and write files 41, from and to the media device 30 through the Web browser 40. The file 41 records certain information 45 related to the media device 30 and the visit of the media device 30 to the Web site 60. The file 41 is persisted in the media device 30. For example, file 41 may have an expiration date of two years. The next time the visitor 20 visits the Web site 60 using the browser 40, the browser 40 may check to see if a file (e.g., the file 41) exists for the Web site 60. If a file exists, the browser 40 may read the file 41 and pass some of the stored information 45 contained in the file 41 to the Web site 60 and/or the analytics service 70. If a file for the Web site 60 does not exist at the browser 40, the browser 40 creates a new file.

With a file 41 installed on the browser 40, the server 66 and/or the analytics service 70 is able to obtain information 45 including time and date of access, duration of access, actions taken on a particular Web page (i.e., a "click" or "hit"), and information identifying the browser 40 (and possibly by extension, the visitor 20). However, in some situations, the media device 30 may have multiple browsers 40, and a file 41 is specific to a particular browser. This means that if the visitor 20 were to access the Web site 60 with a first browser 40A, the server 66 would store a first file 41A linked to the first browser 40. If the visitor 20 subsequently accesses the Web site 60 with a second browser 40B, the server 66 will not associate the first file 41A with the second visit using the second browser 40B, and any information stored with the first file 41A is not used in conjunction with the second visit.

In addition to accessing the Web site 60 using different browsers on the same media device, the visitor 20 may access the Web site 60 using different media devices. These different media devices may be owned and operated by the visitor 20, or may be owned by another individual but operated by the visitor 20, to access the Web site 60. As with different browsers, different media devices used by the same visitor 20 may lead the Web server 66 to initiate generating separate files 41. The result may be that the server 66 and/or the analytics service 70 is not able to correlate visits to the Web site 60 by the visitor 20 when the visitor 20 uses either different browsers 40 on the same media device 30, or uses different media devices 30 for the visits.

The media device 30 (or client 40) may create more than one type of file 41 for the browser 40. In an example, separate files that record a random identification (random ID) 42 and visit data 44. Alternately, these data elements may be stored on a single file 41. Examples of visit data 44 include a domain hash, a time stamp for the current visit, which is set as soon as the browser 40 accesses the Web site 60, a time stamp for a previous visit to the Web site 60, and time stamps for clicks at the Web site 60 during the current visit. The random ID 42 may be written to disk at the conclusion of a browsing session, and thus may be retrieved by the browser 40 upon a subsequent visit to the Web site 60. In an embodiment, the visit data 44 may not be transferred to the analytics service 70 or to the Web server 66. For example, when sessionization occurs at the analytics service 70, only the random ID may be sent to the analytics service 70.

The server 66 also may introduce an "optional" visitor identification (visitor ID) 43 in the data 45 that is returned from the browser 40 to the server 66. The server 66 processes this visitor ID 43 to identify visitors 20 across multiple clients (e.g., multiple media devices and multiple browsers). The server 66 adds the visitor ID 43 to the data 45 that is passed to the analytics service 70. The format of the visitor ID 43, the manner in which the visitor ID 43 is collected at the server 66, and the format of the visitor ID 43 passed to the analytics service 70 may be determined by the Web site owner 61. For example, the addition of the visitor ID 43 may be by way of a log on to the Web site 60 by the visitor 20. In more detail, upon accessing the Web site 60, the visitor 20 may enter a user name and password that uniquely identifies the visitor 20. The server 66 then adds a visitor ID 43 to the data 45, and sends this data 45 to the browser 40. Activity during a current access to the Web site 60 by the browser 40 may be tied to the visitor 20 because of the visitor ID 43. However, while the random ID 42 may be written to disk, the visitor ID 43 may not be written to disk, and thus would not be retrieved by the browser 40 on subsequent visits to the Web site 60.

As noted above, one mechanism for generating the visitor ID 43 is to log on to the Web site 60 and provide, for example, a user name and password. Other mechanisms also may be used to generate the visitor ID 43. For example, the visitor 20 may receive an email with a link or url that the visitor 20 clicks on, after which the Web server 66 is able to access information about the visitor's browser 40 and tie the browser 40 to visitor 20. The server 66 then may create a visitor ID 43.

As an alternative to the visitor ID 43, other linking mechanisms may be used to signal to the analytics service 70 that two or more sessions may be stitched together. For example, a visitor 20 may explicitly state that browsing sessions initiated from a specific browser should be stitched. In an alternative, the Web site 60 may provide this functionality as a "check-the-box" feature, and the visitor 20 may so indicate a desire to have his browsing sessions stitched.

The same visitor 20 is able to access the Web site 60 using other browsers 40A, 40B on the same media device 30. Each browser 40A and 40B receives its own file from the server 66, and each browser 40A and 40B, when accessing the Web site 60 receives a new random ID 42. However, the visitor 20 still may be uniquely identified while using multiple browsers 40 (on a same media device 30 or multiple media devices 30) because of the visitor ID 43. Thus, the analytics service 70, which receives the data 45 from the Web server 68, as well as the Web server 66 itself, may use the visitor ID 43 as a signal to "stitch" together what otherwise might be classified as separate visits or sessions from the visitor 20. This stitching feature and associated process, as well as the benefits session stitching confers, are disclosed below with respect to FIGS. 3-7.

Other transactions may occur among the entities of FIG. 1B that may result in creation of a session. As an example, assume a visitor 20 accesses a Web site for a department store and purchases a chair. The purchase visit may result in creation of a first session (a purchase session). Also note that the visitor may purchase the chair after log in or without log in. Assuming the visitor 20 logs in to the Web site to make the purchase, the Web server 66 will assign a visitor ID than may be used in creating the session. The thus-created session may be stored at the analytics service 70 and keyed to the visitor ID. Assume the chair is delivered to the visitor 20 and the visitor 20, dissatisfied with the chair, returns the chair to a "brick & mortar" store for a refund. A worker at the store then may send a refund event to the analytics service 70, identifying the visitor 20 using the visitor ID. The analytics service 70 then may create a second session (a refund session) for the refund event, and store the second session with the first session. In this manner, the analytics service 70 is able to create a history or database of sessions that relate to a specific visitor 20. Furthermore, not all sessions so created require access to a resource, as the refund session example shows.

Figure 2:
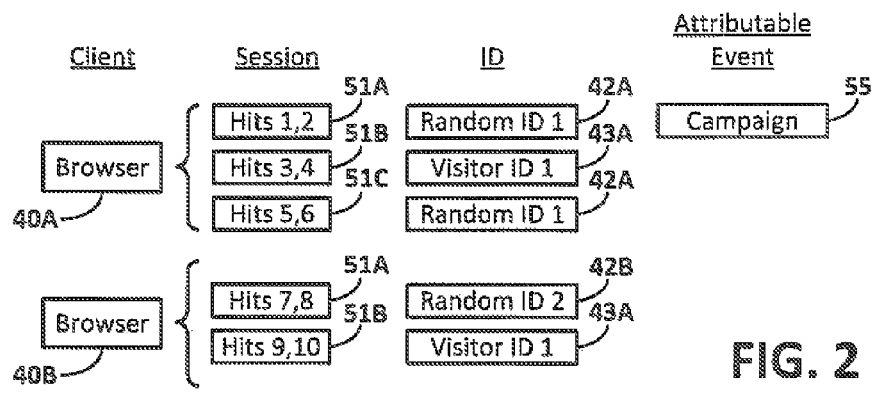
FIG. 2 illustrates an example of visits to, and activity at, a resource.

FIG. 2 illustrates an example of visits to and activity at a resource, such as a Web page 62 of Web site 60. FIG. 2 shows clients 40A and 40B (which in this example are Web browsers). A visitor 20 operates clients 40A and 40B to visit Web site 60. Each such visit may generate hits that may be grouped into a session. Thus, visits and sessions are related by the time a browser access the Web site 60. As shown in FIG. 2, the visits to the Web site 60 by client 40A results in sessions 51A-51C and visits by client 40B results in sessions 51D and 51E. During visits that results in sessions 51B and 51E, the visitor 20 logs on to the Web site 60, which affords the Web server 66 an opportunity to generate a visitor ID 43 in addition to a random ID 42. The visits that result in the sessions 51A, C, and D are not accompanied by a visitor log in, and so no visitor ID 43 is generated. In this example, the session 51A includes hits 1 and 2, 51B includes hits 3 and 4, and 51C includes hits 5 and 6. Session 51D includes hits 7 and 8 and session 51E includes hits 9 and 10. In the context of FIG. 2, a hit may include placing an item in a shopping cart, purchasing an item, downloading content, and clicking on a link. Furthermore, FIG. 2 illustrates two hits per session. However, this number and arrangement of hits is for illustration only, and other combinations and formats of hits could occur from operation of the clients 40A and 40B. Still further, the clients 40A and 40B may be browsers installed on a single media device 30, browsers installed on different media devices 30, applications executing on the same or different media devices 30, or various combinations of browsers, applications, and media devices. Finally, the clients 40A and 40B are not limited to browsers and applications, and may be any hardware, software, or firmware capable of communicating with a remote resource, including Web sites.

FIG. 2 also shows that the Web site access that resulted in session 51A identified client 40A by random ID 42A. This is because the visitor 20 did not log into the Web site 60 when operating client 40A to generate the hits of session 51A. However, the visitor 20 did sign in when generating the hits of session 51B, and the Web server 66 created a visitor ID 43 to identify the visitor 20. At some time subsequent, the visitor 20 operated the client 40A, but again without logging in, and the Web server 66 denoted the client 40A with random ID 42A.

At some time subsequent to the visitor's use of the client 40A, the visitor 20 operates client 40B to access the Web site 60. Because the visitor 20 did not log on during the visit that resulted in session 51D, the random ID 42B is assigned to the client 40B.

FIG. 2 illustrates an additional concept related to sessionization, which may be explained by way of example. Assume that when the client identified by random ID 42A access the Web site 60, the visitor 20 is confronted with an attributable event (which in the example shown is promotional campaign 55) that presents a coupon for 20 percent off certain merchandise available for purchase through the Web site 60. Assume further that hit 1 occurs when the visitor 20 clicks on a link for the 20 percent off promotion. To determine the efficacy of the campaign 55, the Web site owner 61 would like to know if subsequent visits to the Web site 60 by the client identified by random ID 42A are based on the presence of the 20 percent of promotion, or are merely new visits. To make this determination accurately, the analytics service 70 may use a session stitching process that propagates information about the campaign 55 across multiple visits to the Web site 60. This campaign attribution feature is described below.

There are some circumstances in which the campaign 55 may not be propagated to a new session. For example, if the visitor 20 logs in after 30 minutes of inactivity, which leads to the generation of a new session, the campaign 55 may not be propagated to the new session. Alternately, if the visitor 20 logs in after X months of inactivity, the campaign 55 may have timed out and thus the campaign would not be propagated to the new session that results from this log in.

Figure 3:
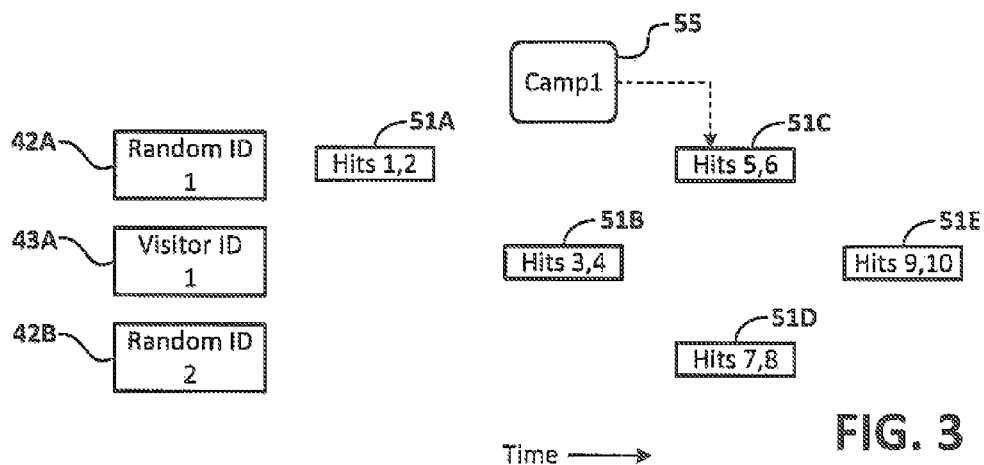
FIG. 3 illustrates an example of sessionization of the resource visits and activity of FIG. 2.

FIG. 3 illustrates an example of initial sessionization phase for the example visits and activity of FIG. 2. In FIG. 3, the time threshold between sessions that may be stitched together may be 30 minutes. In FIG. 3, sessions 51A and 51B are attributed to random ID 42A, and the sessions 51A and 51B are linked by campaign 55. Campaign 55 originated with hit 1 of session 51A. Sessions 51B and 51E are attributed to visitor ID 43A because the visitor 20 logged on to the Web site 60 during the respective visits. Finally, session 51D is attributed to random ID 42B.

Figure 4:
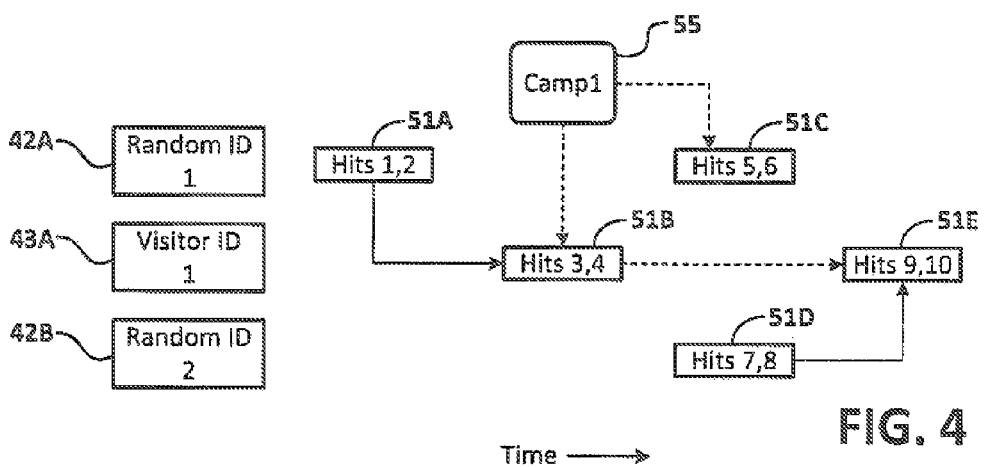
FIG. 4 illustrates an example of campaign attribution among sessions of FIG. 3.

FIG. 4 illustrates an example of campaign attribution among the sessions of FIG. 3. Random ID 42A is coupled to sessions 51A, 51B, and 51C. Visitor ID 43A is coupled to sessions 51B and 51E. Since sessions 51A and 51B share common random ID 42A, campaign 55 is attributed to session 51B under the assumption that a visit by client 40A to the Web site 60 that is subsequent to the visit by client 40A resulting in session 51A was the result of the campaign 55 and thus, the session 51B should be attributed to campaign 55. Session 51C also is attributed to campaign 55 because the visit to Web site 60 that resulted in session 51C was made by client 40A, which is assigned random ID 42A. Campaign 55 further is attributed to session 51E because although sessions 51E and 51B have different random IDs, sessions 51E and 51B have in common, visitor ID 43A.

Figure 5:
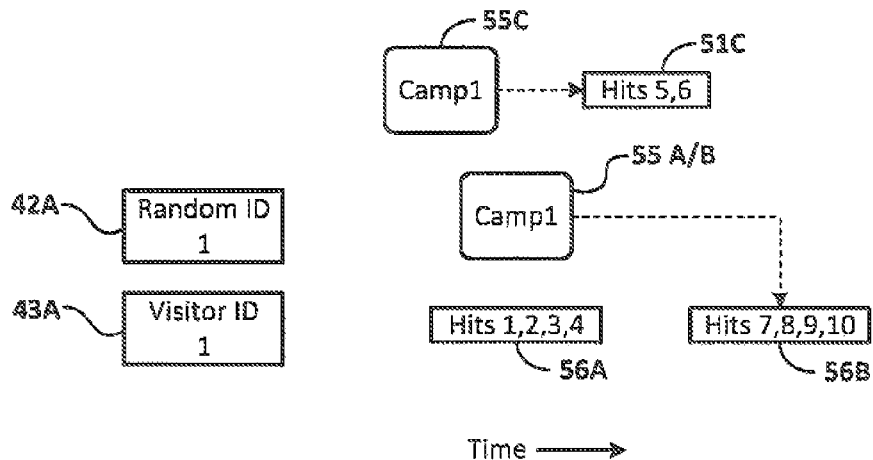
FIG. 5 illustrates an example of session stitching based on the resource visits and activity of FIG. 2.

FIG. 5 illustrates the end result of stitching the sessions of FIGS. 3 and 4. The assignment of visitor ID 43A to sessions 51B and 51E allows the sessions to be stitched with sessions having the same random ID, but created prior in time to sessions 51B and 51E, respectively (but within 30 minutes, for example). That is, sessions 51A and 51B have the same random ID, meaning they may be stitched together as coming from the same client (client 40A). In addition, session 51B has visitor ID 43A and is subsequent in time to session 51A. Thus, the assignment of visitor ID 43A to session 51B signals to the analytics service 70 that sessions 51A and 51B should be stitched together to form session 56A. Similar logic applies to sessions 51D and 51E. The result of the stitching of these sessions is session 56B. Further, because campaign 55A/B is attributed to at least one of the sessions that compose sessions 56A and 56B, the campaign 55A/B is propagated to sessions 56A and 56B. Finally, campaign 55C also (optionally) is propagated to session 51C. Finally, because the sessions 51A and 51B have in common the visitor ID 43A, the analytics service 70 may relate the sessions 51A and 51B using the visitor ID 43A.

Figure 6:
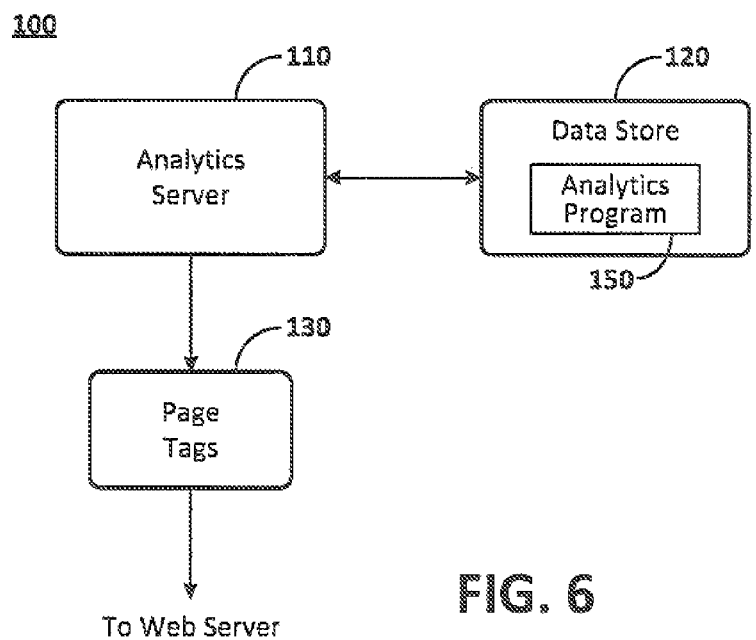
FIG. 6 illustrates an example of a system that monitors, sessionizes, stitches sessions, and reports visits to and activity.

FIG. 6 illustrates an example of a system that monitors, analyzes, sessionizes, and reports visits to and activity at a resource. In FIG. 6, system 100, implemented through analytics service 70, includes analytics server 110 and data store 120. The server 110 includes computer processing functions of the analytics service 70. The server 110 generates page tags 130, which may be associated with each of the Web pages 62. In an embodiment, the server 110 provides the page tags 130, which may be code snippets that the Web site owner 61 adds onto every Web page 62. If a browser 40 supports the same code as in the page tag 130, the page tag 130 collects visit data 44 and sends the visit data 44 to the server 110. In an embodiment, the code snippet of the page tag 130 is a Java script file.

The data store 120 includes non-transitory computer readable storage medium for storing machine instruction executed by the server 110 to enable session stitching operations. The data store 120 also includes data storage to store visit data 44, random IDs 42, and visitor IDs, as well as other data needed to execute the session stitching operations. Finally, the data store 120 stores analytics program 150, which is executed by the processor 110.

Figure 7A:
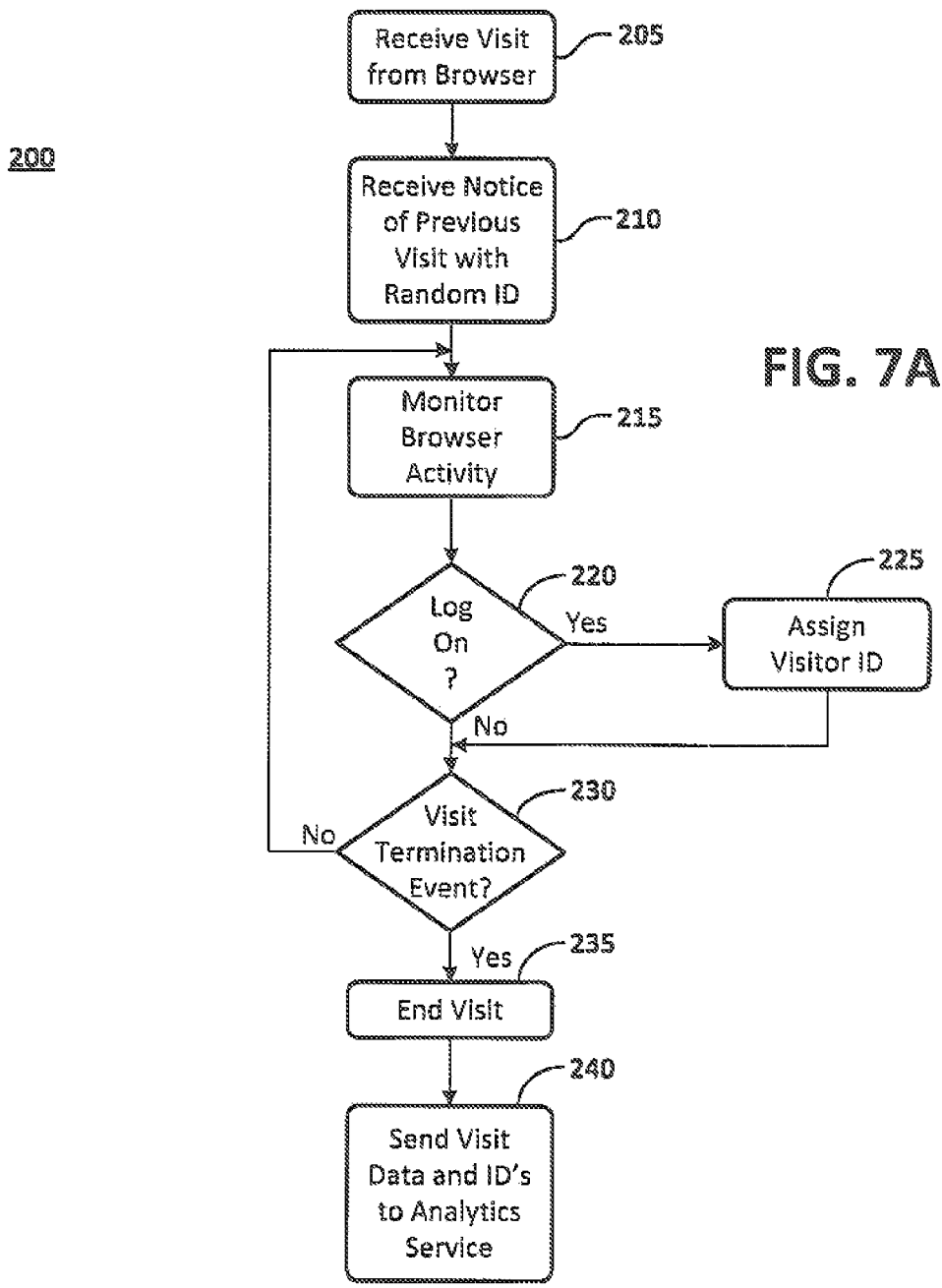
FIGS. 7A and 7B are flowcharts illustrating example sessionization and session stitching operations.
Figure 7B:
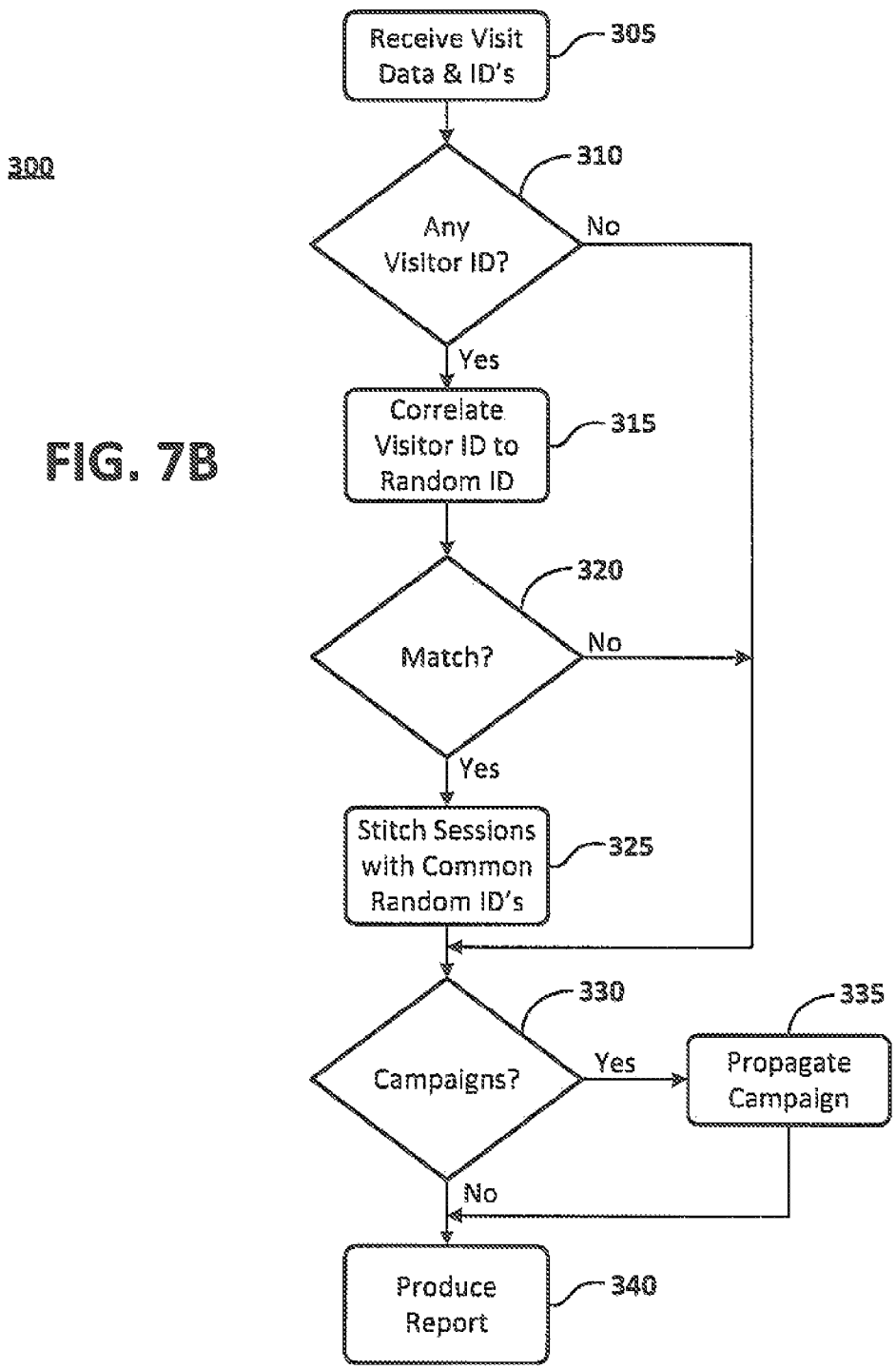

FIGS. 7A and 7B are flowcharts illustrating example session stitching operations. FIG. 7A illustrates session stitching operations from the perspective of the Web server 66 for a visit to Web site 60 by browser 40. In FIG. 7A, session stitching operation 200 begins in block 205 when the Web server 66 receives a visit from browser 40. In block 210, browser 40 notifies the server 66 that a file 41 was previously created during an earlier visit to the Web site 60. The file 41 includes a unique random ID 42. In block 215, the server 60 monitors the browser 40 to detect any visitor activity such as clicks on the Web site 60. In block 220, the server 66 determines if the visitor 20 has logged on (or already is logged on) to the Web site 60. If the visitor 20 has logged on, the operation 200 moves to block 225, and the server 66 records the log on information, creates a visitor ID 43, and sends the visitor ID 43 to the browser 40. The operation then moves to block 230. Following block 220, if the visitor 20 has not logged on, the operation 200 moves to block 230. In block 230, a determination is made that a visit is terminated. In an example, a visit is a single hit to a Web page 62. In another example, a visit includes multiple hits to Web pages 62 where a visit terminating event, such as a timeout threshold violation, has occurred. If a visit terminating event has occurred, the operation 200 moves to block 235. Otherwise, the operation 200 returns to block 215. In block 235, the server 66 ends the visit. In block 240, the server 66 sends the visit data 44, random ID 42, and optionally the visitor ID 43 to the analytics service 70. The operation 200 then ends.

FIG. 7B illustrates session stitching operations from the perspective of the analytics service 70. In FIG. 7B, session stitching operation 300 begins in block 305 when the analytics service 70 receives the visit data 44 and the IDs. In block 310, the service 70 determines if a visitor ID 43 is included. If there is no visitor ID 43, the operation 300 moves to block 330. If a visitor ID 43 is included, the operation 300 moves to block 315. In block 315, the service 70 attempts to correlate the visitor ID 43 to any random IDs 42. In block 320, the service 70 determines if there are any matches between the random IDs 42 and the visitor ID 43 for previous Web site visits. If there are no matches, the operation 300 moves to block 330. If there are any matches, the operation 300 moves to block 325 and the service 70 stitches together any sessions associated with previous Web site visits having a common random ID. In block 330, the service 70 determines if any campaigns 55 are associated with any hits recorded by the server 66. If there are associated campaigns 55, the operation 300 moves to block 335 and the service 70 propagates the campaigns 55 to the stitched together sessions. If there are no associated campaigns 55, the operation 300 moves to block 340. In block 340, the service 70 prepares a session report that may be accessed by the web site owner 61. The operation 300 then ends.

Certain of the devices shown in FIGS. 1A, 1B, and 6 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying description to illustrate the embodiments represented in FIGS. 7A and 7B. The disclosed devices, components, and systems contemplate using or implementing any suitable technique for performing the steps illustrated. Thus, FIGS. 7A and 7B are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

We claim:

1. A method of combining a plurality of device sessions, comprising:
    receiving, by a processor of a server, first network activity data of a first device corresponding to a first network activity session having a first timestamp;
    generating, by a resource provided by the server responsive to the first network activity data, an anonymous identifier for the first network activity data;
    providing, by the server, the anonymous identifier to the first device for storing in memory of the first device;
    providing, by the server for display via the first device, a session login interface;
    receiving, by the server from the first device, login credentials from the first device, the login credentials including a predetermined identifier;
    establishing, by the server responsive to authenticating the login credentials, a second network activity session for the first device, the second network activity session having a second timestamp and associated with both the predetermined identifier and the anonymous identifier;
    determining, by the server, a time interval between the first timestamp of the first network activity session and the second timestamp of the second network activity session;
    generating, by the server responsive to the time interval satisfying a threshold, a session link between the first network activity session and the second network activity session based on the second network activity session having both the anonymous identifier and the predetermined identifier; and
    stitching, by the server using the session link, the first network activity session together with the second network activity session.

2. The method of claim 1, further comprising:
    identifying a third network activity session created from a visit by the first device to a resource provided by the server, the visit having the anonymous identifier; and
    stitching together the first session, the second session, and the third session based on the session link and the anonymous identifier.

3. The method of claim 2, wherein the resource is an Internet Web site and the first device comprises an Internet browser.

4. The method of claim 1, wherein the anonymous identifier is a random identifier created by the resource.

5. The method of claim 1, wherein the session link comprises a visitor identification created by the server, and wherein the first device does not store the visitor identification.

6. The method of claim 5, wherein the server creates the visitor identification based on information submitted via the first device.

7. The method of claim 1, wherein the login credentials include a user name and password.

8. The method of claim 1, further comprising:
    determining, by the server, that at least some of the first network activity data is associated with a first attributable event.

9. The method of claim 1, further comprising:
    determining, by the server, that at least some of the first network activity data is associated with a first attributable event; and
    attributing the second network activity session to the first attributable event.

10. The method of claim 1, further comprising:
- identifying, by the server, a third network activity session created based on third network activity data of a second device, the second device having a second anonymous identifier and the third session having the second anonymous identifier and the session link;
- associating the third network activity session with the stitched together first and second network activity sessions; and
- propagating an attributable event to the third network activity session.

11. The method of claim 1, wherein the first activity data includes an operation of an application.

12. The method of claim 1, wherein the first activity data includes an off-line operation.

13. The method of claim 1, further comprising:
- receiving, from a second device, third network activity data and an identifier from the third network activity data of the second device;
- receiving the session link associated with the first network activity session and the second network activity session;
- creating a third network activity session based on the identifier, the third network activity data, and the session link; and
- relating the third network activity session and the second network activity session using the session link.

14. The method of claim 13, wherein the second network activity data is associated with a first attributable event, the method further comprising:
- propagating the first attributable event to the third network activity session.

15. A system for combining a plurality of device sessions, comprising:
- a processor; and
- a program of machine instructions that when executed by the processor cause the processor to:
  - receive first network activity data of a first device corresponding to a first network activity session having a first timestamp;
  - generate, by a resource provided by the server responsive to the first network activity data, an anonymous identifier for the first network activity data;
  - provide the anonymous identifier to the first device for storing in memory of the first device;
  - provide, for display via the first device, a session login interface;
  - receive, from the first device, login credentials from the first device, the login credentials including a predetermined identifier;
  - establish, responsive to authenticating the login credentials, a second network activity session for the first device, the second network activity session having a second timestamp and associated with both the predetermined identifier and the anonymous identifier;
  - determine a time interval between the first timestamp of the first network activity session and the second timestamp of the second network activity session;
  - generate, responsive to the time interval satisfying a threshold, a session link between the first network activity session and the second network activity session based on the second network activity session having both the anonymous identifier and the predetermined identifier; and
  - stitch, using the session link, the first network activity session together with the second network activity session.

16. The system of claim 15, wherein the anonymous identifier is a random identifier created by the server.

17. The system of claim 15, wherein the processor provides an Internet Web site and the first device includes an Internet browser.

18. The system of claim 15, wherein the anonymous identifier is stored with the first device.

19. The system of claim 15, wherein the session link is a visitor identification created by the server, and wherein the first device does not store the visitor identification.

20. The system of claim 15, wherein the processor propagates campaign information from the first network activity session to the second network activity session.

21. The system of claim 15, wherein the processor:
- identifies a third network activity session created from a visit by the first device to a resource provided by the server, the visit having the anonymous identifier; and
- stitches together the first session, the second session, and the third session based on the session link and the anonymous identifier.

22. The system of claim 15, wherein the processor:
- creates the visitor identification based on information submitted via the first device.

23. The system of claim 15, wherein the login credentials include a user name and password.

24. The system of claim 15, wherein the processor:
- determines that at least some of the first network activity data is associated with a first attributable event.

25. The system of claim 15, wherein the processor:
- determines that at least some of the first network activity data is associated with a first attributable event; and
- attributes the second network activity session to the first attributable event.

26. The system of claim 15, wherein the processor:
- identifies a third network activity session created based on third network activity data of a second device, the second device having a second anonymous identifier and the third session having the second anonymous identifier and the session link;
- associates the third network activity session with the stitched together first and second network activity sessions; and
- propagates an attributable event to the third network activity session.

27. The system of claim 15, wherein the first activity data includes an operation of an application.

28. The system of claim 15, wherein the first activity data includes an off-line operation.

29. The system of claim 15, wherein the processor:
- receives, from a second device, third network activity data and an identifier from the third network activity data of the second device;
- receives the session link associated with the first network activity session and the second network activity session;
- creates a third network activity session based on the identifier, the third network activity data, and the session link; and
- relates the third network activity session and the second network activity session using the session link.

30. The system of claim 29, wherein the second network activity data is associated with a first attributable event, and wherein the processor:
- propagates the first attributable event to the third network activity session.

* * * * *